United States Patent [19]
Scherer

[11] Patent Number: 5,507,361
[45] Date of Patent: Apr. 16, 1996

[54] CONTROL SYSTEM FOR INFLUENCING THE SPEED OF A MOTOR VEHICLE

[75] Inventor: Roland Scherer, Crailsheim, Germany

[73] Assignee: Voith Turbo GmbH & Co. KG, Crailsheim, Germany

[21] Appl. No.: 348,334

[22] Filed: Dec. 2, 1994

[30] Foreign Application Priority Data

Dec. 3, 1993 [DE] Germany ............... 43 41 213.0

[51] Int. Cl.⁶ .................................... B60K 31/00
[52] U.S. Cl. .................. 180/176; 180/177; 123/360; 364/426.04
[58] Field of Search ................... 180/170, 175, 180/176, 177, 178, 179; 364/426.01, 426.02, 426.03, 426.04; 123/352, 360

[56] References Cited

U.S. PATENT DOCUMENTS 4,934,476  6/1990  Hyodo .......................... 180/176
5,333,109  7/1994  Oo et al. ..................... 180/176

FOREIGN PATENT DOCUMENTS 4154435  5/1992  Japan.

OTHER PUBLICATIONS

Voith Turbo GmbH & Co. KG, "30 Years of Safety with Voith Retarders," No. Cr 229 e 7.94 1000 SDZ.
Wabco Westinghouse, "Geschwindigkeitsbegrenzer $GB_{Prop}$," Print 820 000 000 3/4.92, 1992.

Primary Examiner—Richard M. Camby
Attorney, Agent, or Firm—Baker & Daniels

[57] ABSTRACT

A control system for influencing the speed of a motor vehicle. The invention is characterized in that the retarder controller and the pertaining servomechanism already available in a vehicle with an installed retarder is in traction operation additionally utilized for throttling the drive engine down when a presettable allowed maximum value of the speed is exceeded.

10 Claims, 1 Drawing Sheet

CONTROL SYSTEM FOR INFLUENCING THE SPEED OF A MOTOR VEHICLE

BACKGROUND OF THE INVENTION

The invention concerns a control system for influencing the speed of a motor vehicle.

It is known that trucks may be equipped with the two systems:
- retarder with additional function "constant speed"—RCS (regulation to constant speed by means of retarder control), and
- automatic speed limitation—ASL (the internal combustion is throttled down as a presettable maximum value is exceeded).

The employment of both systems is such that both operate autarchically—RCS for downhill travel and ASL in traction operation. With appropriate setpoint selection by the operator, notably on more severe grades, activating the retarder with the function "constant speed" causes the maintenance of the speed desired by the operator.

In traction operation (=engine operation), i.e., at level, uphill travel or also a light grade with the engine preferably idling and thus displaying a slight engine braking action and natural retardation, the automatic speed limitation (ASL) causes the maintenance of a fixed or variable preset maximum speed.

The system for automatic speed limitation in traction operation is comprised of a regulator and a servomechanism acting on the internal combustion engine, notably on the fuel dosing device (throttle plate or fuel injection). A limit value prescribed by law or other speed value meant not to be exceeded (maximum speed allowed) is either stored fixed in the regulator or freely selectable by the operator and storable in the regulator. The actual value input of the regulator is coupled to a measuring device that measures the actual speed of the vehicle, respectively the speed of rotation of the wheels. A continual comparison takes place between the current actual value and the speed value which is not to be exceeded (preset maximum speed). As long as the current actual speed remains below the preset maximum speed, a call for a higher speed made by the operator, for instance on the gas pedal, is converted to a control signal for the fuel dosing system. However, when the current actual speed is higher than the selected preset maximum speed, a regulating system for maintaining the preset maximum speed is activated, and the regulation enjoys a greater priority than the speed control by means of gas pedal input. In this case, the variation between actual and preset maximum speed is converted to a control signal for the servomechanism, which acts directly on the fuel dosing system of the internal combustion engine. The latter is throttled down until the limit value of the preset maximum speed is no longer exceeded. In downhill travel, the system of automatic speed limitation can be effective until the control range, which normally covers the working range of the internal combustion engine, is exhausted.

Components required for realization of the ASL function are a controller, respectively a regulator, and a pertaining servomember, respectively a servomechanism, for adjustment of the fuel dosing system of the internal combustion engine or, more generally, of the power output member of a drive engine. The servomechanism is either of strictly electromechanical design, for instance an electric servomotor, or of electropneumatic design, that is, in the form of an electropneumatic valve with pertaining servocylinder.

The retarder system with the function "constant speed" allows only manual activation by operator intervention. For realization of this task, a controller and a servomechanism in the form of a proportional valve are coordinated with the retarder. However, the controller and servomechanism are also required for realization of further control tasks that can be realized by means of the retarder and employed as well in a motor vehicle with ASL system. These tasks include the setting of a specific braking moment, the setting of a constant braking moment, and of a constant retardation.

Both systems serve to influence the travel speed, but they may be effective in different states of operation of the vehicle. Owing to the existence of two control, respectively regulating, systems—one for throttling the engine down as a presettable maximum speed value is exceeded, and a second one for control of the retarder—a large number of necessary system components are involved, translating to high linkage expense and requiring installation space. The great number of system components entails a very high probability of failure of one of the two systems by failure of system components.

The problem underlying the invention is to avoid the existing drawbacks when both systems are present, such as by integrating both systems in the vehicle in such a way that a reduction in the total number of system components is accomplished, thereby lowering the failure probability of the systems, and also precluding error sources.

SUMMARY OF THE INVENTION

The inventional solution to the problem consists of utilizing the retarder controller and pertaining servomechanism, which in a vehicle with an installed retarder are already available, in traction operation additionally for throttling the engine down as a presettable allowed maximum speed value is exceeded.

The overall system is thereby rendered more compact; with only one controller and one servomechanism still being used, installation space in the vehicle is gained. The failure probability diminishes due to the reduction in the number of system components.

The control system is comprised of a controller, a servomechanism and a switching system. The controller has at least two inputs—a first input for a speed signal and a second input for a signal from a retarder switch. Moreover, there are at least two outputs provided—a first output for a control signal and a second output for a switching signal. The first input is coupled to a measuring system that measures the actual speed of the vehicle, or the speed of rotation of the wheels. The second input is coupled to the retarder switch.

The first output is coupled to the servomechanism and the second output to the switching system. The latter has at least two switching positions; a first one for connecting the servomechanism with the retarder and a second one in which the servomechanism is coupled to the power output member of the engine. Means are provided which compare the current actual speed with a presettable allowed maximum speed and which, as the maximum speed is exceeded and with the retarder switch set to zero, effect a coupling of the servomechanism to the engine and, in the event that the maximum speed is exceeded and a signal from the retarder switch is present, the servomechanism is coupled to the retarder.

Input signals from the retarder switch may be braking stages (BS), a desired braking moment ($M_{brake}$) or a preselectable value for a speed to be kept constant ($v_{const}$). In the first case, the controller issues on the first output the appropriate control signal for the servomechanism, while in the second case a regulating system subordinate to the control system is activated. Analogous thereto, further control and regulating functions may also be preset on the retarder switch, for instance a desired constant retardation.

Further favorable embodiment options are also set forth. Utilized as a common servomechanism is the proportional valve, which is already required for retarder control. The power output member is then provided with a servocylinder which can be acted upon by the output pressure of the proportional valve.

The switching device establishing the connection between servomechanism and retarder or drive engine in accordance with the possible switching positions, dependent on the signals prevailing on the input of the controller, is preferably fashioned as a switching valve in the form of a multiple-way valve.

In a further aspect of the invention, the control system can be advanced and expanded to the effect that additional favorable functions can be carried out with it. A first option consists in specifying priorities in order to render erroneous actions by the operating personnel ineffective, for instance a simultaneous activation of the retarder by adjustment of the retarder switch and actuation of a foot pedal or gas pedal, that is, adjustment on the power output member of the engine such that a speed increase will be obtained. In this case, the retarder and engine would counteract each other. In keeping with the retarder preselection and the intensity of gas pedal actuation, only unsatisfactory results are achieved for both systems, viewed individually, due to their counteractions. Therefore, establishing priorities applicable to specific cases of application for the individual systems is appropriate. In the cited case, the retarder is preferably given priority.

In case of simultaneous actuation of retarder and gas pedal as the maximum speed is exceeded, the retarder preferably always has priority. As an alternative, there is also the option that the function chosen last by the operator—gas pedal or retarder switch—becomes effective.

When activating the constant speed function of the retarder, it may be appropriate to adjust the power output member of the engine in such a way that the idling position will be obtained. This will avoid a conflict between drive engine and retarder. Realization of this requires either the provision of an additional switching valve or using the switching valve in the form of a suitable multiple-way switching valve which meets this objective.

The means determining or specifying all of the relations between the input and output variables of the controller may be fashioned, e.g., as an internal switching logic or may be programmable routines with the controller fashioned as a microprocessor. Consequently, the tasks of a regulator can also be performed within the controller.

BRIEF DESCRIPTION OF THE DRAWING

The inventional solution will be illustrated hereafter with the aid of a block diagram shown in FIG. 1.

DETAILED DESCRIPTION OF THE INVENTION

Figure 1:
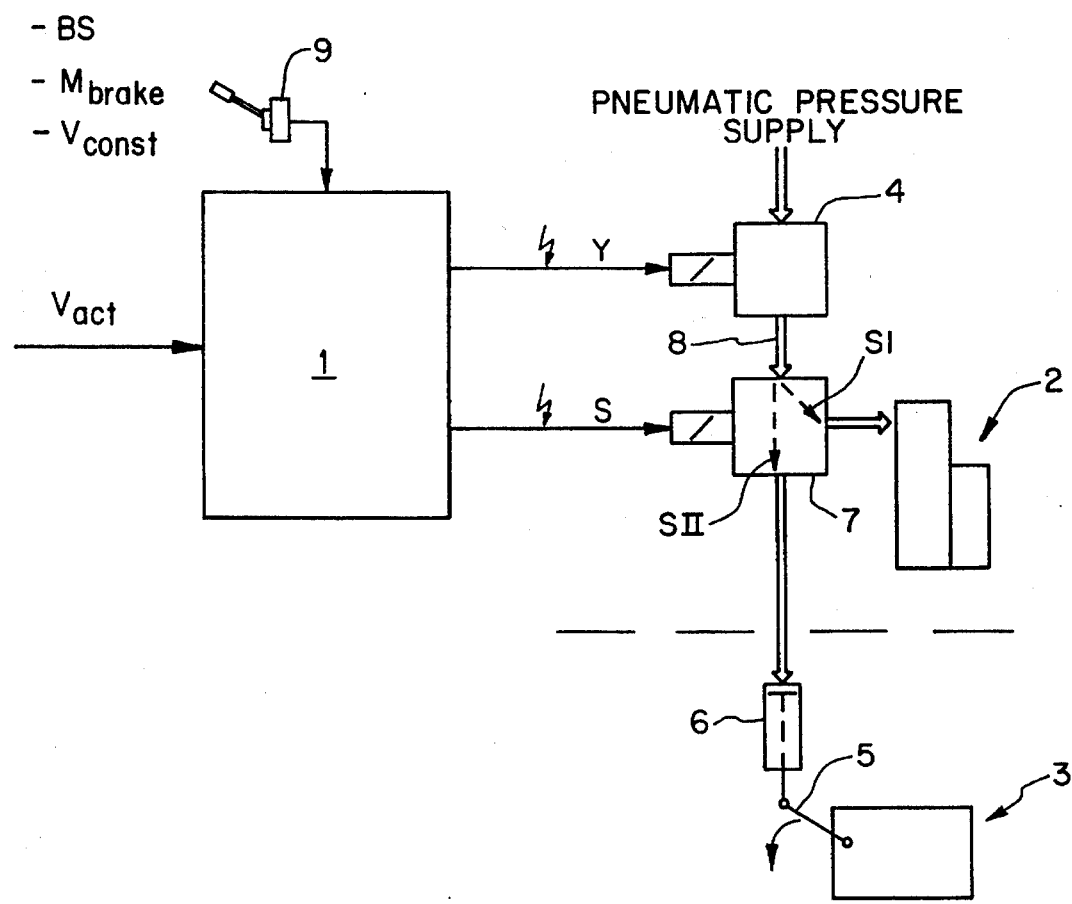

FIG. 1 shows a controller 1 for realization of control and regulating tasks on a retarder 2 and a drive engine 3, the latter fashioned for instance as an internal combustion engine.

Realizing a desired braking moment depends on changing the filling degree of the retarder 2. Control of the filling degree of the retarder is normally effected by compressed air. The required pressure is furnished by an actuator 4, normally a proportional pressure valve. The magnitude of the pneumatic output pressure of the proportional pressure valve determines the change in filling degree of the retarder.

The internal combustion engine 3 features a fuel dosing system 5. Upon exceeding a preselectable value for a maximum allowable speed $v_{lim}$, a servoelement, presently a pneumatic servocylinder 6, becomes effective on system 5. To effect an appropriate adjustment on the fuel dosing system 5, a servomechanism allows the required pressure to act on the servocylinder 6. Employed as the servomechanism is presently the proportional valve 4, which is already required for retarder control.

Also acting on fuel dosing mechanism 5 is a mechanism, not illustrated herein, which effects an adjustment of the fuel dosing mechanism 5 in accordance with a call for higher speed or acceleration effected by the operator, for instance by actuation of a foot pedal. This direct control between foot pedal and fuel dosing mechanism 5 is ineffective upon activation, or exceeding, of the preselected value for the maximum allowable speed $v_{lim}$.

The controller features at least two inputs—a first input and a second input—and at least two outputs—a first output and a second output. Arranged after the controller are the proportional valve 4 and a switching mechanism 7 for coordinating the proportional valve 4 with the retarder 2 or the internal combustion engine 3, that is, for connecting the servomechanism 4 with the retarder or the fuel dosing mechanism of the internal combustion engine. For that purpose, the output of the proportional valve connects, via working line 8, to the switching mechanism 7 and, according to the latter's switching position, with the retarder or the fuel dosing mechanism. The switching mechanism 7 is structured and fashioned such that in keeping with the input variables of the controller and the desired function it is able to establish at least two switching positions. A first switching position SI serves to establish the connection between servomechanism 4 and retarder 2. A second switching position SII serves to connect the servomechanism 4 with the internal combustion engine 3. With the servomechanism fashioned as a proportional valve, the output pressure of the proportional valve is in the first switching position SI effective on the retarder 2, while in the second switching position SII it acts on the servocylinder 6 of the fuel dosing mechanism. Decisive for the individual switching positions are also the sequences which are internally provided in the controller.

A presettable signal for a desired braking moment $M_{brake}$, a braking stage BS or also, if possible, a desired value for a speed $v_{const}$ to be kept constant etc. is fed to the first input on the retarder switch 9. A signal for the actual speed value $v_{act}$, which value is continually determined by means of a measuring device not shown here, is passed to the second input.

A control signal Y for the proportional valve 4 is issued at the first output, while on the second output a signal S for coordination of the output pressure of the proportional valve with the retarder 2 or the internal combustion engine 3 is issued.

As regards the signals prevailing on the inputs, a differentiation is required between various cases:

1) First input: tachometer signal for $v_{act}$; second input: retarder switch in zero position $v_{act} < v_{lim}$.

2) First: input: tachometer signal for $v_{act}$; second input: retarder switch in zero position $v_{act} > v_{lim}$.

3) First: input: tachometer signal for $v_{act}$; second input: retarder switch signal for $M_{brake}$, or $v_{const}$, $v_{act} < v_{lim}$.

4) First input: tachometer signal for $v_{act}$; second input: retarder switch signal for $M_{brake}$ or $v_{const}$, $v_{act} > v_{lim}$.

With the tachometer signal for the travel speed $v_{act}$, present, a comparison takes place within the controller 1, or subordinate to the control system, with the allowable maximum speed $v_{lim}$, which must not be exceeded. The allowable maximum speed $v_{lim}$ is either a value stored in hardware fashion within the controller 1 or may be issued to the controller by the operator as a possible third input variable.

When the actual speed $v_{act}$, is lower than the allowable maximum speed $v_{lim}$, no control and switching signals are issued for the servomechanism 4 and the switching mechanism 7. In case of an acceleration call by the operator by actuation of the gas pedal, an adjustment on the fuel dosing system equivalent to the desired acceleration takes place by means of direct control between foot pedal and fuel dosing system.

When the current actual speed equals or exceeds the allowable maximum speed $v_{lim}$, the regulating system for maintaining the allowable maximum speed $v_{lim}$ is activated. The signal for linking the servomechanism 4 to the fuel dosing mechanism of the internal combustion engines prevails on the second output of the controller.

The proportional valve 4 allows a pressure to act on the servocylinder 6. The pressure results in a displacement of the piston in the servocylinder 6 to effect a change in the setting on the fuel dosing system. The required pressure is established through a signal on the first output on the proportional valve 4. The continual comparison of actual and allowable maximum speed takes place, e.g., in a regulator integrated in the controller. Throttling the internal combustion engine down continues until the allowable maximum speed $v_{lim}$ is no longer exceeded.

When the current actual speed $v_{act}$, is smaller than the allowable maximum speed $v_{lim}$ and a signal for a desired braking moment $M_{brake}$, which prevails on the second input, was preset on the retarder switch 9, the controller issues on its second output the signal for connecting the proportional valve 4 to the retarder. The control signal for the proportional valve to make an appropriate output pressure available that causes a change of the filling degree prevails on the first output.

At downhill travel and preselection of "constant speed" on the retarder switch 9, a comparison subordinate to the control system occurs between the preset speed $v_{const}$, and the current actual speed. With a variation between $v_{act}$ and $v_{const}$, the controller 1 issues on its second output the signal for connecting the proportional valve 4 to the retarder 2. Prevailing on the first output is the control signal Y to the proportional valve, for making available an output pressure required for achieving constant speed and causing a change in retarder filling degree, and thus producing appropriate braking moments.

In a further aspect of the invention, the control system can be advanced and expanded to the effect that additional functions favorable to the travel performance can be fulfilled. These include:

1. settling priorities;
2. idling of the engine during any activation of the constant speed function.

The first objective consists in not allowing erroneous operations by the operating personnel to become effective, for instance a simultaneous activation of the retarder, e.g., by selection on the retarder switch 9, and actuation of a foot pedal or gas pedal, that is, selection on the power output member 5 of the engine such that an increase in speed would result. In this case, retarder 2 and engine 3 counteract each other. In keeping with the retarder design and the foot pedal actuation, a satisfactory result can be achieved for none of the individual systems. It is appropriate to specify from the outset which of the activated systems takes priority—preferably the retarder. As an alternative, there is the option of allowing the function selected last by the operator (foot pedal or retarder switch 9) to become effective.

In case of simultaneous activation of the retarder and actuation of the foot pedal or gas pedal at maximum speed, the retarder actuation is preferably assigned priority.

Moreover, it is recommended to establish idling of the engine upon actuation of the retarder, or the retarder function "constant speed." Although not detailed herein, the use of a suitable multiple-way switching valve as a switching valve is possible. A further option is providing an additional switching valve for activation of the pneumatic servocylinder.

These additional functions can be realized as well with the controller, but additional inputs and outputs need to be provided for that purpose, and further relations need to be established between the input and output variables in the controller. The controller becomes more compact because, for example, additional points of comparison and linkages with case decisions need to be provided.

The inventional design of the basic control system can be expanded to include additional functions in keeping with applications.

What is claimed is:

1. A control system for speed influencing for use in a motor vehicle with a retarder and a drive engine, wherein the retarder includes a switch and the drive engine includes a power output member, the system comprising:

a controller provided with at least two inputs and at least two outputs;

a servomechanism;

a switching mechanism comprising at least two switching positions including a first switching position and a second switching position;

measuring system means for measuring an actual speed of the vehicle;

wherein said servomechanism is coupled to the retarder when said switching mechanism is disposed in said first switching position;

wherein said servomechanism is connected to the power output member of the drive engine when said switching mechanism is disposed in said second switching position;

wherein said at least two inputs comprise a first input for a speed signal and a second input for a signal from the retarder switch;

wherein said at least two outputs comprise a first output for a control signal and a second output for a switching signal;

wherein said first input is coupled to said measuring system means;

wherein said first output is coupled to said servomechanism;

wherein said second output is coupled to said switching mechanism; and means for comparing the actual speed with a presettable allowable maximum speed, wherein said comparing means further cause said servomechanism to be coupled to the drive engine when the actual speed exceeds the maximum speed with the retarder switch in a zero position, and wherein said comparing means further cause said servomechanism to be coupled to the retarder when the signal from the retarder switch is present and the actual speed exceeds the maximum speed.

2. The control system of claim 1 wherein said measuring system means operates by measuring a speed of rotation of the wheels of the vehicle.

3. The control system of claim 1 wherein said servomechanism comprises a pneumatic proportional valve, and wherein a pneumatic servocylinder is coordinated with the power output member of the drive engine.

4. The control system of claim 1 wherein said switching mechanism comprises a multiple-way valve.

5. The control system of claim 1 wherein said switching mechanism assumes said first switching position when said actual speed is less than said maximum speed and upon presence of the signal from the retarder switch and a simultaneous activation of a second control system becoming effective on the power output member.

6. The control system of claim 1 wherein the signal from the retarder switch comprises a maintenance of a desired settable constant speed value, wherein said comparing means effects a continual comparison between said actual speed and said desired constant speed value, and wherein the retarder is controlled to change vehicle speed to said constant speed value when a variation between said actual speed and said desired constant speed value is identified.

7. The control system of claim 1 wherein said comparing means comprises a switching logic integrated in said controller.

8. The control system of claim 1 wherein said controller comprises a microprocessor.

9. The control system of claim 8 wherein said comparing means comprises preprogrammable routines processed by said microprocessor.

10. The control system of claim 1 wherein the signal from the retarder switch comprises a maintenance of a constant speed, and wherein the power output member of the drive engine is first set to an idling position.

\* \* \* \* \*